No. 610,985. Patented Sept. 20, 1898.
J. H. GOSS.
VALVE FOR INFLATION.
(Application filed Feb. 17, 1898.)

(No Model.)

Attest:
Howell Bartle
Nellie Callahan

Inventor:
John H. Goss,
by W. H. Finchel,
Atty.

UNITED STATES PATENT OFFICE.

JOHN H. GOSS, OF WATERBURY, CONNECTICUT, ASSIGNOR TO THE SCOVILL MANUFACTURING COMPANY, OF SAME PLACE.

VALVE FOR INFLATION.

SPECIFICATION forming part of Letters Patent No. 610,985, dated September 20, 1898.

Application filed February 17, 1898. Serial No. 670,705. (No model.)

*To all whom it may concern:*

Be it known that I, JOHN H. GOSS, a citizen of the United States, residing at Waterbury, in the county of New Haven and State of Connecticut, have invented a certain new and useful Improvement in Valves for Inflation, of which the following is a full, clear, and exact description.

This invention relates more particularly to valves for use in inflating pneumatic tires.

The objects of the invention are to reduce the number of parts of such valves and to strengthen and render more efficient and durable the parts employed.

The invention comprises the following features in detail and in combination, namely: a valve-plunger composed of a rivet having a head and a stem or shank of proper length, a perforated rubber or other elastic washer encircling the stem and arranged next to the head, and a shell or cap which is secured to the head of the rivet and incloses the sides of the washer and is constricted or contracted about such washer to hold it in place. This shell or cap has its inner closed end indented laterally, forming a sort of pyramidal projection by which the usual spring is centered and maintained in position, and free passage of the air under the coils of the spring is allowed when the latter are contracted—that is to say, when the coiled spring is compressed.

Figure 1:
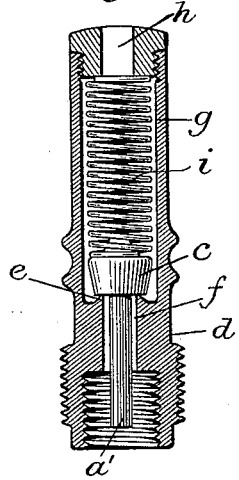
Figure 2:
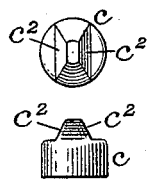
Figure 3:
Figure 3:
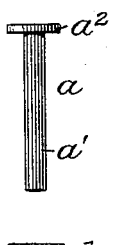
Figure 4:
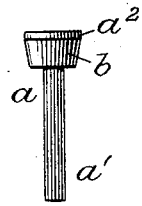
Figure 5:
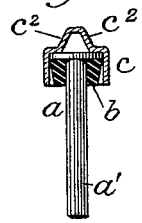
Figure 6:
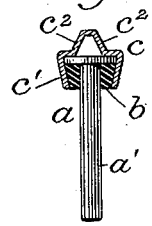

In the accompanying drawings, illustrating my invention, in the several figures of which like parts are similarly designated, Figure 1 is a longitudinal section of the valve, showing the valve-plunger and its spring in elevation. Fig. 2 is a plan and side view of the shell. Fig. 3 shows the shell in section, the rivet in elevation, and the washer in section ready for assembling. Fig. 4 is an elevation of the rivet and washer assembled. Fig. 5 is a section showing the rivet, washer, and shell assembled and before the shell is contracted about the washer. Fig. 6 is a section showing the finished plunger.

In carrying out my invention I take a metal or other rivet-like body $a$, such as shown in Fig. 3, having a thin or slender stem or shank $a'$ and a preferably thin flat head $a^2$, and upon it is arranged next its head the rubber or other flexible or yielding washer $b$. A shell or cap $c$ of metal is fitted over and fixed to the head and so as to surround the washer, as in Fig. 5, and then its sides $c'$ are compressed, constricted, or contracted about the washer, as in Fig. 6, so as to unite the rivet, washer, and shell. The shell has its inner end indented at $c^2 c^2$, forming a sort of pyramidal projection, whereby the spring (hereinafter designated $i$) is centered and maintained in position, and a free passage for the air is afforded when the spring is compressed by the opening of the valve.

The casing $d$ may be of any approved construction and has the valve-seat $e$, air-passage $f$, spring-chamber $g$, and perforated outlet-cap $h$. The spring $i$ is arranged in the spring-chamber between cap $h$ and the plunger, so as to force the plunger's washer to the seat and allow the requisite play of the plunger for opening the valve for the inflation of the object to which the valve is applied.

Some of the advantages incident to my invention are, first, great economy in manufacture; second, I am enabled to use a plunger-stem of much smaller diameter than heretofore has been possible where the stem has been turned from solid rod, whereby the resistance to the passage of the air through the valve is reduced, and hence, also, I can employ a somewhat stiffer spring than is commonly used without increasing the pressure of inflation, and consequently the liability to leakage is reduced; third, the fact that there are two flat sides to the conical or pyramidal projection of the shell on which the coiled spring is seated makes the air-passage free when the coils of the spring are set together, as occurs when high pressure is used for inflating, and, fourth, the plunger, because of its small diameter, being freely movable in the valve-throat, permits the washer to be seated squarely against the valve-seat even though the stem may not be at right angles to the valve-seat.

I have thus described one form of my invention, but wish to be understood as not limiting my invention to mere details.

What I claim is—

1. A valve for inflation, comprising a plunger composed of a preferably thin, flat-headed rivet-like body, an elastic washer encircling the stem next the head, and a cap placed over the head and secured about said head and contracted about the washer, substantially as described.

2. A valve for inflation, comprising a plunger having a relatively thin stem, a thin, flat head, an elastic washer, encircling the stem next to the head, and a shell or cap placed over and firmly secured to the head and contracted about the washer, substantially as described.

3. A valve for inflation, comprising a plunger having a head, a stem, an elastic washer encircling the stem and arranged next to the head, a shell or cap inclosing the head and washer and contracted about the same, and having a laterally-indented inner end projection, substantially as described.

4. A valve for inflation, comprising a plunger having a head, a stem, an elastic washer encircling the stem and arranged next to the head, a shell or cap inclosing the head and washer and contracted about the same, and having a laterally-indented inner end projection, and a relatively stiff coiled spring which is seated upon said inner projection, substantially as described.

In testimony whereof I have hereunto set my hand this 16th day of February, A. D. 1898.

JOHN H. GOSS.

Witnesses:
T. R. HYDE, Jr.,
J. H. PILLING.